United States Patent
Zhang et al.

(10) Patent No.: US 12,340,429 B2
(45) Date of Patent: Jun. 24, 2025

(54) DISTRIBUTED ENERGY STORAGE PLANNING METHOD AND SYSTEM FOR POWER DISTRIBUTION NETWORK

(71) Applicant: DONGGUAN POWER BUREAU OF GUANGDONG POWER GRID CO., LTD., Dongguan (CN)

(72) Inventors: Chuanliang Zhang, Dongguan (CN); Haitao Li, Dongguan (CN); Zhiyang Liu, Dongguan (CN); Jinrun Huang, Dongguan (CN); Chongzhi Zhai, Dongguan (CN); Wei Du, Dongguan (CN); Xiaofei Wan, Dongguan (CN); Tianhang Wang, Dongguan (CN); Zhirong Mai, Dongguan (CN); Huifang Zheng, Dongguan (CN); Jiaying Feng, Dongguan (CN); Wenhui Huang, Dongguan (CN); Jinjiang Yu, Dongguan (CN); Jianming Chen, Dongguan (CN)

(73) Assignee: DONGGUAN POWER BUREAU OF GUANGDONG POWER GRID CO., LTD., Dongguan (CN)

( * ) Notice: Subject to any disclaimer, the term of this patent is extended or adjusted under 35 U.S.C. 154(b) by 0 days.

(21) Appl. No.: 18/847,592

(22) PCT Filed: Dec. 5, 2022

(86) PCT No.: PCT/CN2022/136467
§ 371 (c)(1),
(2) Date: Sep. 16, 2024

(87) PCT Pub. No.: WO2023/173817
PCT Pub. Date: Sep. 21, 2023

(65) Prior Publication Data
US 2025/0111450 A1    Apr. 3, 2025

(30) Foreign Application Priority Data

Mar. 16, 2022 (CN) .................. 202210255517.X

(51) Int. Cl.
*G06Q 50/06* (2024.01)
*G06Q 10/0631* (2023.01)
*H02J 3/38* (2006.01)

(52) U.S. Cl.
CPC ......... *G06Q 50/06* (2013.01); *G06Q 10/0631* (2013.01); *H02J 3/381* (2013.01); *H02J 2203/20* (2020.01)

(58) Field of Classification Search
CPC ..... G06Q 50/06; G06Q 10/0631; H02J 3/381; H02J 2203/20
See application file for complete search history.

(56) References Cited

U.S. PATENT DOCUMENTS

| | | | |
|---|---|---|---|
| 10,289,757 B2 * | 5/2019 | McClure | G06F 17/11 |
| 10,839,436 B2 * | 11/2020 | Nasle | G06Q 50/06 |
| 11,750,148 B2 * | 9/2023 | Erb | E04H 12/347 |
| | | | 136/251 |

(Continued)

FOREIGN PATENT DOCUMENTS

| | | |
|---|---|---|
| CN | 105976108 A | 9/2016 |
| CN | 107832905 A | 3/2018 |

(Continued)

OTHER PUBLICATIONS

Office Action issued in Chinese Application No. 202210255517.X, dated Apr. 22, 2022.

(Continued)

*Primary Examiner* — Ziaul Karim
(74) *Attorney, Agent, or Firm* — Michael Best & Friedrich LLP

(57) ABSTRACT

Provided are a distributed energy storage planning method and system for a power distribution network. The method includes a step S1 of setting a mathematical indicator for (Continued)

quantitatively evaluating superiority and inferiority of construction positions of distributed energy storage assemblies as a location evaluation indicator in a distribution area of a distributed power supply, a step S2 of planning an optimal laying path of the distributed energy storage assemblies in a planning area based on the location evaluation indicator and a step S3 of constructing the distributed energy storage assemblies according to the optimal laying path and connecting the distributed energy storage assemblies to the power distribution network to perform an energy storage operation so that the distributed power supply performs orderly energy storage on the distributed energy storage assemblies in the power distribution network.

8 Claims, 1 Drawing Sheet

(56) References Cited

U.S. PATENT DOCUMENTS

2005/0096797 A1\* 5/2005 Matsubara ................ H02J 3/00
    700/291

2005/0150008 A1\* 7/2005 Demmer ............ C12N 15/8245
    435/468
2021/0118054 A1    4/2021 Turner et al.
2021/0157312 A1\* 5/2021 Cella .................... G01M 13/045
2023/0253790 A1\* 8/2023 Cella ....................... G06N 20/00
    700/291

FOREIGN PATENT DOCUMENTS

| CN | 109038560 A | 12/2018 |
| CN | 109325694 A | 2/2019 |
| CN | 109615260 A | 4/2019 |
| CN | 110570015 A | 12/2019 |
| CN | 113435777 A | 9/2021 |
| CN | 113962504 A | 1/2022 |
| CN | 114330938 A | 4/2022 |
| JP | 2005032196 A | 2/2005 |

OTHER PUBLICATIONS

International Search Report issued in International Application No. PCT/CN2022/136467, dated Mar. 1, 2023.

\* cited by examiner

DISTRIBUTED ENERGY STORAGE PLANNING METHOD AND SYSTEM FOR POWER DISTRIBUTION NETWORK

CROSS-REFERENCE TO RELATED APPLICATIONS

This is a National Stage Application filed under 35 U.S.C. 371 based on International Patent Application No. PCT/CN2022/136467, filed on Dec. 5, 2022, which claims priority to Chinese Patent Application No. 202210255517.X filed on Mar. 16, 2022, the disclosures of both of which are incorporated herein by reference in their entireties.

TECHNICAL FIELD

The present application relates to the technical field of planning power distribution networks, for example, a distributed energy storage planning method and system for a power distribution network.

BACKGROUND

As distributed photovoltaic permeability in a power distribution network gradually increases, the problem of voltage violation of a system becomes more and more serious. As one of the effective ways to solve this problem, energy storage, especially distributed energy storage, will improve a voltage condition of the power distribution network if planned properly.

In a method for planning a distributed energy storage system, planning factors of energy storage units include an energy storage type, a construction position, an energy storage capacity, energy storage power and a scheduling strategy. However, methods in the related art are mostly concentrated on a certain aspect or several certain aspects, for example, a method for solving a scheduling strategy or a scheduling strategy and an energy storage capacity of an energy storage system, while a method for integrally planning the five factors is lacked.

CN202110579079.8 discloses a distributed energy storage planning method and apparatus for a power distribution network considering power supply of a significant load. The method includes the following steps: performing distributed energy storage planning on an actual power distribution network to obtain a planning objective function of distributed energy storage in the power distribution network; adding constraints to the obtained planning objective function, where the constraints include distributed energy storage configuration, an operating constraint, a photovoltaic output constraint, a distribution network power flow constraint, a safety constraint and a reliable power supply constraint of the significant load, thereby obtaining a non-convex nonlinear mixed integer planning model; and processing the mixed integer planning model into a mixed integer second-order cone planning model through a convex optimization method, and solving the obtained mixed integer second-order cone planning model. The present application improves the economical efficiency of the planning solution on the premise of ensuring the reliable power supply of the significant load.

Although the above related art can improve an economic benefit of the distributed energy storage planning to a certain extent, construction positions of energy storage assemblies cannot be determined, and the orderly energy storage of the energy storage assemblies cannot be implemented.

SUMMARY

The present application provides a distributed energy storage planning method and system for a power distribution network to solve the technical problems that construction positions of energy storage assemblies cannot be determined and the orderly energy storage of the energy storage assemblies cannot be implemented in the related art.

The present application specifically provides the technical solutions described below.

A distributed energy storage planning method for a power distribution network includes the steps described below.

In step S1, a mathematical indicator for quantitatively evaluating superiority and inferiority of construction positions of distributed energy storage assemblies is set as a location evaluation indicator in a distribution area of a distributed power supply.

In step S2, an optimal laying path of the distributed energy storage assemblies is planned in a planning area based on the location evaluation indicator so that a planning benefit of the construction positions of the distributed energy storage assemblies in the planning area is globally optimal, where the optimal laying path is characterized as a path formed after construction positions of all distributed energy storage assemblies in the planning area are connected in order.

In step S3, the distributed energy storage assemblies are constructed according to the optimal laying path, and the distributed energy storage assemblies are connected to the power distribution network to perform an energy storage operation, where an energy storage priority is set for the energy storage operation with the optimal laying path as a criterion so that the distributed power supply performs orderly energy storage on the distributed energy storage assemblies in the power distribution network.

As an optional solution of the present application, setting the mathematical indicator for quantitatively evaluating the superiority and the inferiority of the construction positions of the distributed energy storage assemblies as the location evaluation indicator includes the steps described below.

A construction cost of the distributed energy storage assemblies is quantized as a cost evaluation indicator, and an energy storage benefit of the distributed energy storage assemblies is quantized as the benefit evaluation indicator.

Adaptive weights are set for the cost evaluation indicator and the benefit evaluation indicator based on a production year of the distributed energy storage assemblies, and weighted summation is performed on the cost evaluation indicator and the benefit evaluation indicator based on the adaptive weights to obtain the location evaluation indicator.

As an optional solution of the present application, quantizing the construction cost of the distributed energy storage assemblies as the cost evaluation indicator includes the steps described below.

A single construction cost and a construction cost of an energy storage line of each distributed energy storage assembly are quantized, and the single construction cost and the construction cost of the energy storage line of the each distributed energy storage assembly are summed to obtain a construction cost of the each distributed energy storage assembly, where a calculation formula of the construction cost is as follows:

$$f_i = A + a * \sqrt{(x_i - x_0)^2 + (y_i - y_0)^2}.$$

In the formula, $f_i$ is characterized as a construction cost of an i-th distributed energy storage assembly, A is characterized as a single construction cost, a is characterized as a construction cost of a unit length of an energy storage line, $x_i$ and $y_i$ are characterized as an abscissa value and an ordinate value of a positional coordinate of the i-th distributed energy storage assembly, respectively, $x_0$ and $y_0$ are characterized as an abscissa value and an ordinate value of a positional coordinate of the distributed power supply, respectively, $\sqrt{(x_i-x_0)^2+(y_i-y_0)^2}$ is characterized as a length of an energy storage line between the i-th distributed energy storage assembly and the distributed power supply, and $a*\sqrt{(x_i-x_0)^2+(y_i-y_0)^2}$ is characterized as a construction cost of the energy storage line of the i-th distributed energy storage assembly.

Construction costs of all the distributed energy storage assemblies are summed to obtain the cost evaluation indicator, where a calculation formula of the cost evaluation indicator is as follows:

$$F = \sum_{i=1}^{n} f_i.$$

In the formula, F is characterized as the cost evaluation indicator, n is characterized as the total number of distributed energy storage assemblies, i is a measurement constant without a substantive meaning, and the energy storage line is characterized as being located between the distributed power supply and the distributed energy storage assemblies so that the distributed power supply performs discharge and energy storage on the distributed energy storage assemblies.

As an optional solution of the present application, quantizing the energy storage benefit of the distributed energy storage assemblies as the benefit evaluation indicator includes the steps described below.

A single energy storage benefit and a loss benefit of an energy supply line of the each distributed energy storage assembly are quantized, and the single energy storage benefit and the loss benefit of the energy supply line of the each distributed energy storage assembly are differenced to obtain an energy storage benefit of the each distributed energy storage assembly, where a calculation formula of the energy storage benefit is as follows:

$$g_i = B - b*\sqrt{(x_i-x_1)^2+(y_i-y_1)^2}.$$

In the formula, $g_i$ is characterized as an energy storage benefit of the i-th distributed energy storage assembly, B is characterized as a single energy storage benefit, b is characterized as a loss benefit of a unit length of an energy supply line, $x_i$ and $y_i$ are characterized as the abscissa value and the ordinate value of the positional coordinate of the i-th distributed energy storage assembly, respectively, $x_1$ and $y_1$ are characterized as an abscissa value and an ordinate value of a positional coordinate of an energy supply input end in the power distribution network, respectively, $\sqrt{(x_i-x_1)^2+(y_i-y_1)^2}$ is characterized as a length of an energy supply line between the i-th distributed energy storage assembly and the power distribution network, and $b*\sqrt{(x_i-x_1)^2+(y_i-y_1)^2}$ is characterized as a loss benefit of the energy supply line of the i-th distributed energy storage assembly.

Energy storage benefits of all the distributed energy storage assemblies are summed to obtain the benefit evaluation indicator, where a calculation formula of the benefit evaluation indicator is as follows:

$$G = \sum_{i=1}^{n} g_i.$$

In the formula, G is characterized as the benefit evaluation indicator, n is characterized as the total number of distributed energy storage assemblies, i is the measurement constant without the substantive meaning, and the energy supply line is characterized as being located between the distributed energy storage assemblies and the power distribution network so that the distributed energy storage assemblies perform discharge and energy supply on the power distribution network.

As an optional solution of the present application, using the adaptive weights for adaptively controlling degrees of effect of the cost evaluation indicator and the benefit evaluation indicator on the location evaluation indicator appearing as the production year increases and constructing the adaptive weights by using a sigmoid function includes the steps described below.

In the case where the degree of effect of the cost evaluation indicator on the location evaluation indicator tends to decrease as the production year of the distributed energy storage assemblies increases, the weight $$\omega_1 = \frac{\alpha}{1+e^{-N}}$$

of the cost evaluation indicator is constructed by using $$\frac{1}{1+e^{-N}}$$

in the sigmoid function.

In the case where the degree of effect of the benefit evaluation indicator on the location evaluation indicator tends to increase as the production year of the distributed energy storage assemblies increases, the weight $$\omega_2 = \frac{\beta}{1+e^{N}}$$

of the benefit evaluation indicator is constructed by using $$\frac{1}{1+e^{N}}$$

in the sigmoid function.

$\omega_1$ and $\omega_2$ are characterized as the weight of the cost evaluation indicator and the weight of the benefit evaluation indicator, respectively, $\alpha$ and $\beta$ are constant coefficients without substantive meanings, and N is characterized as the production year.

As an optional solution of the present application, performing the weighted summation on the cost evaluation indicator and the benefit evaluation indicator based on the adaptive weights to obtain the location evaluation indicator includes the steps described below.

The cost evaluation indicator is weighted by using the weight $\omega_1$ of the cost evaluation indicator to obtain $\omega_1*F$, and the benefit evaluation indicator is weighted by using the weight $\omega_2$ of the benefit evaluation indicator to obtain $\omega_2*G$.

$\omega_1*F$ and $\omega_2*G$ are summed to obtain the location evaluation indicator Z, where a calculation formula of the location evaluation indicator is as follows:

$$Z=\omega_1*F+\omega_2*G.$$

As an optional solution of the present application, planning the optimal laying path of the distributed energy storage assemblies in the planning area based on the location evaluation indicator includes the steps described below.

In step one, the distribution area is rasterized to form a square raster map as a solving space, a square raster with an object present in the solving space is demarcated as an impassable raster, and a square raster without an object present in the solving space is demarcated as a passable raster.

In step two, a square raster where the distributed power supply is located is used as a search start point, n square rasters adjacent to the search start point are set as search space, and whether the impassable raster exists is determined in the search space.

If the impassable raster exists, the number of square rasters is doubled in the search space so that the search space is doubled, and the step two is performed.

If the impassable raster does not exist, a step three is performed.

In step three, a location evaluation indicator of each passable raster is calculated by using a positional coordinate of the each passable raster in the search space, passable rasters are arranged in a descending order based on location evaluation indicators, and first n passable rasters are selected as search targets.

In step four, a distance value between each search target and the search start point are calculated in sequence, the search targets are arranged in an ascending order according to distance values, and the search targets are linked to form the optimal laying path.

As an optional solution of the present application, a space size of the square raster is consistent with a single space size of the distributed energy storage assemblies to construct the distributed energy storage assemblies in the square raster.

As an optional solution of the present application, an energy storage priority of distributed energy storage assemblies located from a start point to an end point of the optimal laying path varies from high to low.

As an optional solution of the present application, the present application provides a planning system according to the distributed energy storage planning method for a power distribution network. The planning system includes an indicator setting unit, a path setting unit and an energy storage planning unit.

The indicator setting unit is configured to set a mathematical indicator for quantitatively evaluating superiority and inferiority of construction positions of distributed energy storage assemblies as a location evaluation indicator in a distribution area of a distributed power supply.

The path setting unit is configured to plan an optimal laying path of the distributed energy storage assemblies in a planning area based on the location evaluation indicator so that a planning benefit of the construction positions of the distributed energy storage assemblies in the planning area is globally optimal, where the optimal laying path is characterized as a path formed after construction positions of all distributed energy storage assemblies in the planning area are connected in order.

The energy storage planning unit is configured to construct the distributed energy storage assemblies according to the optimal laying path and connect the distributed energy storage assemblies to the power distribution network to perform an energy storage operation, where an energy storage priority is set for the energy storage operation with the optimal laying path as a criterion so that the distributed power supply performs orderly energy storage on the distributed energy storage assemblies in the power distribution network.

In the present application, the construction positions of the distributed energy storage assemblies are planned based on two aspects of cost and benefit, the adaptive weights are added to the cost and the benefit to form the location evaluation indicator, and the degrees of effect of the cost and the benefit on the location evaluation indicator appearing as the production year increases are adaptively controlled, which is more consistent with features of variation trends of the cost and the benefit appearing as the production year increases, thereby improving planning accuracy. Moreover, the optimal laying path of the distributed energy storage assemblies is planned in the planning area based on the location evaluation indicator so that the planning benefit of the construction positions of the distributed energy storage assemblies in the planning area is globally optimal, thereby improving the ordering of the planning.

REFERENCE LIST 1 indicator setting unit
2 path setting unit
3 energy storage planning unit

DETAILED DESCRIPTION

The technical solutions in embodiments of the present application will be described clearly and completely in conjunction with the drawings in embodiments of the present application. Apparently, the embodiments described hereinafter are part, not all, of embodiments of the present application.

Figure 1:
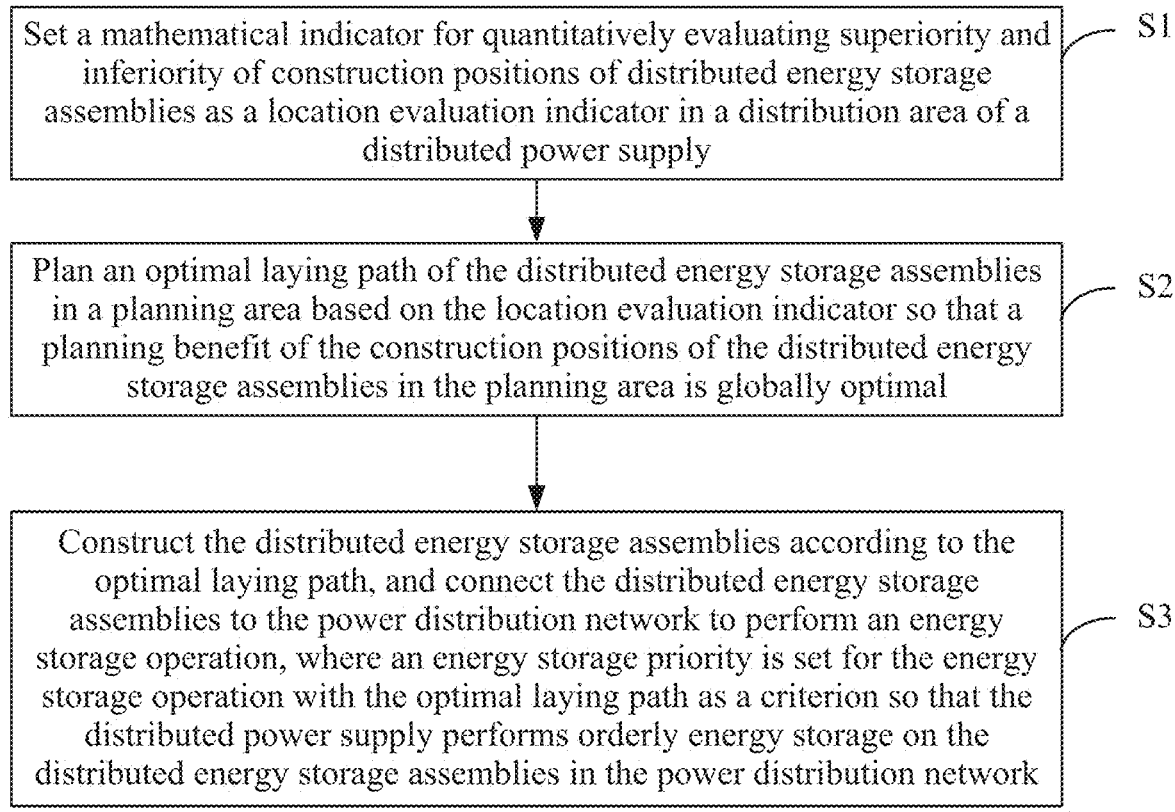
FIG. 1 is a flowchart of a distributed energy storage planning method for a power distribution network according to an embodiment of the present application.
Figure 2:
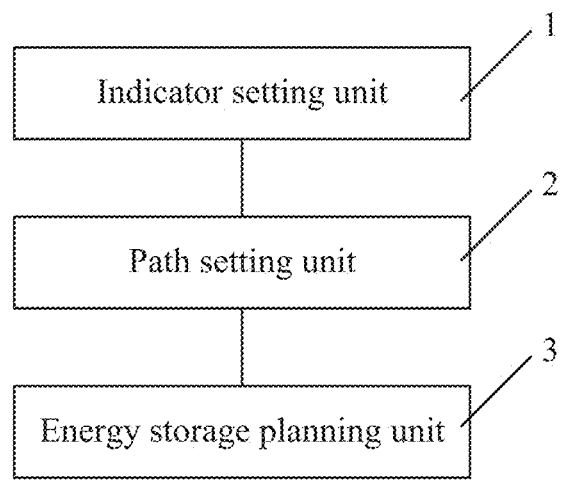
FIG. 2 is a block diagram of a planning system according to an embodiment of the present application.

As shown in FIG. 1, the present application provides a distributed energy storage planning method for a power distribution network. The method includes the steps described below.

In step S1, a mathematical indicator for quantitatively evaluating superiority and inferiority of construction positions of distributed energy storage assemblies is set as a location evaluation indicator in a distribution area of a distributed power supply.

Setting the mathematical indicator for quantitatively evaluating the superiority and the inferiority of the construction positions of the distributed energy storage assemblies as the location evaluation indicator includes the steps described below.

The distributed energy storage assembly mainly includes two portions: an electric energy storage unit and an energy storage supporting facility. The distributed energy storage assembly can be constructed between the power distribution network side and the distributed power supply side, thereby providing an energy storage service for the multi-energy complementary distributed power supply and providing an energy supply service for a user of the power distribution network. Key devices of a distributed energy storage system include two portions: an electric energy storage unit and an energy storage supporting device. The electric energy storage unit may be a mechanical energy storage device, a physical energy storage device and a chemical energy storage device (a battery) according to different energy storage modes. The mechanical energy storage device may include a compressed air energy storage device and a flywheel energy storage device, the physical energy storage device may include a supercapacitor device and a superconducting energy storage device, and the chemical energy storage device may include a vanadium flow battery, a zinc bromine flow battery, a sodium sulphur battery, a lead-acid battery and a lithium-ion battery. The energy storage supporting facility includes an energy storage line and an energy supply line.

The farther the construction position of the distributed energy storage assembly is from the distributed power supply, the longer the energy storage line that needs to be laid between the distributed power supply and the distributed energy storage assembly is, and correspondingly, the higher the construction cost is. On the contrary, the closer the construction position of the distributed energy storage assembly is to the distributed power supply, the shorter the energy storage line that needs to be laid between the distributed power supply and the distributed energy storage assembly is, and correspondingly, the lower the construction cost is. A single construction cost of the distributed energy storage assembly refers to a construction cost of the energy storage device in the electric energy storage unit. A cost of a single energy storage device is fixed and does not vary as the construction position varies. Therefore, the construction position of the distributed energy storage assembly affects a cost of the energy storage supporting facility. The construction cost may be used as an evaluation indicator of the construction position, optimized and solved to obtain a most suitable construction position.

Similarly, the farther the construction position of the distributed energy storage assembly is from the power distribution network, the longer the energy supply line that needs to be laid between the power distribution network and the distributed energy storage assembly is, and correspondingly, the higher the power supply loss is, the higher the power supply benefit loss is. On the contrary, the closer the construction position of the distributed energy storage assembly is to the power distribution network, the shorter the energy supply line that needs to be laid between the power distribution network and the distributed energy storage assembly is, and correspondingly, the lower the power supply loss is, the lower the power supply benefit loss is. A single power supply benefit of the distributed energy storage assembly refers to a benefit produced after the energy storage device in the electric energy storage unit supplies electrical energy with a full capacity to the power distribution network. Electrical energy with a full capacity of the single energy storage device is fixed and does not vary as the construction position varies. Therefore, the construction position of the distributed energy storage assembly affects a loss of the electrical energy in a power supply line of an energy supply supporting facility. An energy storage benefit may be used as the evaluation indicator of the construction position, optimized and solved to obtain the most suitable construction position.

The construction cost and the energy storage benefit are used as two optimization targets of the construction position, and the two optimization targets are balanced and solved to obtain an optimal solution of the construction position, thereby forming an optimal laying path and achieving a globally optimal solution effect with higher solution quality.

A construction cost of the distributed energy storage assemblies is quantized as a cost evaluation indicator, and an energy storage benefit of the distributed energy storage assemblies is quantized as the benefit evaluation indicator.

Adaptive weights are set for the cost evaluation indicator and the benefit evaluation indicator based on a production year of the distributed energy storage assemblies, and weighted summation is performed on the cost evaluation indicator and the benefit evaluation indicator based on the adaptive weights to obtain the location evaluation indicator.

Quantizing the construction cost of the distributed energy storage assemblies as the cost evaluation indicator includes the steps described below.

A single construction cost and a construction cost of an energy storage line of each distributed energy storage assembly are quantized, and the single construction cost and the construction cost of the energy storage line of the each distributed energy storage assembly are summed to obtain a construction cost of the each distributed energy storage assembly, where a calculation formula of the construction cost is as follows:

$$f_i = A + a * \sqrt{(x_i - x_0)^2 + (y_i - y_0)^2}.$$

In the formula, $f_i$ is characterized as a construction cost of an i-th distributed energy storage assembly, A is characterized as a single construction cost, a is characterized as a construction cost of a unit length of an energy storage line, $x_i$ and $y_i$ are characterized as an abscissa value and an ordinate value of a positional coordinate of the i-th distributed energy storage assembly, respectively, $x_0$ and $y_0$ are characterized as an abscissa value and an ordinate value of a positional coordinate of the distributed power supply, respectively, $\sqrt{(x_i - x_0)^2 + (y_i - y_0)^2}$ is characterized as a length of an energy storage line between the i-th distributed energy storage assembly and the distributed power supply, and $a * \sqrt{(x_i - x_0)^2 + (y_i - y_0)^2}$ is characterized as a construction cost of the energy storage line of the i-th distributed energy storage assembly.

Construction costs of all the distributed energy storage assemblies are summed to obtain the cost evaluation indicator, where a calculation formula of the cost evaluation indicator is as follows:

$$F = \sum_{i=1}^{n} f_i.$$

In the formula, F is characterized as the cost evaluation indicator, n is characterized as the total number of distributed energy storage assemblies, i is a measurement constant without a substantive meaning, and the energy storage line is characterized as being located between the distributed power supply and the distributed energy storage assemblies so that the distributed power supply performs discharge and energy storage on the distributed energy storage assemblies.

Quantizing the energy storage benefit of the distributed energy storage assemblies as the benefit evaluation indicator includes the steps described below.

A single energy storage benefit and a loss benefit of an energy supply line of the each distributed energy storage assembly are quantized, and the single energy storage benefit and the loss benefit of the energy supply line of the each distributed energy storage assembly are differenced to obtain an energy storage benefit of the each distributed energy storage assembly, where a calculation formula of the energy storage benefit is as follows:

$$g_i = B - b\sqrt{*(x_i-x_1)^2+(y_i-y_1)^2}.$$

In the formula, $g_i$ is characterized as an energy storage benefit of the i-th distributed energy storage assembly, B is characterized as a single energy storage benefit, b is characterized as a loss benefit of a unit length of an energy supply line, $x_i$ and $y_i$ are characterized as the abscissa value and the ordinate value of the positional coordinate of the i-th distributed energy storage assembly, respectively, $x_1$ and $y_1$ are characterized as an abscissa value and an ordinate value of a positional coordinate of an energy supply input end in the power distribution network, respectively, $\sqrt{(x_i-x_1)^2+(y_i-y_1)^2}$ is characterized as a length of an energy supply line between the i-th distributed energy storage assembly and the power distribution network, and $b*\sqrt{(x_i-x_1)^2+(y_i-y_1)^2}$ is characterized as a loss benefit of the energy supply line of the i-th distributed energy storage assembly.

Energy storage benefits of all the distributed energy storage assemblies are summed to obtain the benefit evaluation indicator, where a calculation formula of the benefit evaluation indicator is as follows:

$$G = \sum_{i=1}^{n} g_i.$$

In the formula, G is characterized as the benefits evaluation indicator, n is characterized as the total number of distributed energy storage assemblies, i is the measurement constant without the substantive meaning, and the energy supply line is characterized as being located between the distributed energy storage assemblies and the power distribution network so that the distributed energy storage assemblies perform discharge and energy supply on the power distribution network.

Using the adaptive weights for adaptively controlling degrees of effect of the cost evaluation indicator and the benefit evaluation indicator on the location evaluation indicator appearing as the production year increases and constructing the adaptive weights by using a sigmoid function includes the steps described below.

In the case where the degree of effect of the cost evaluation indicator on the location evaluation indicator tends to decrease as the production year of the distributed energy storage assemblies increases, the weight $$\omega_1 = \frac{\alpha}{1+e^{-N}}$$

of the cost evaluation indicator is constructed by using $$\frac{1}{1+e^{-N}}$$

in the sigmoid function.

In the case where the degree of effect of the benefit evaluation indicator on the location evaluation indicator tends to increase as the production year of the distributed energy storage assemblies increases, the weight $$\omega_2 = \frac{\beta}{1+e^N}$$

of the benefit evaluation indicator is constructed by using $$\frac{1}{1+e^N}$$

in the sigmoid function.

$\omega_1$ and $\omega_2$ are characterized as the weight of the cost evaluation indicator and the weight of the benefit evaluation indicator, respectively, $\alpha$ and $\beta$ are constant coefficients without substantive meanings, and N is characterized as the production year.

Actually, the longer the production year of the distributed energy storage assemblies is, the consideration of the construction positions is more biased towards the energy storage benefit, and the higher the weight of the benefit evaluation indicator in the location evaluation indicator is; the shorter the production year of the distributed energy storage assemblies is, the consideration of the construction positions is more biased towards the construction cost, and the higher the weight of the cost evaluation indicator in the location evaluation indicator is. For the cost evaluation indicator and the benefit evaluation indicator, the longer the production year of the distributed energy storage assemblies is, the smaller the construction cost is after the construction cost is amortized over the production year, the lower the proportion of the importance of the construction cost accounting for the setting of the construction positions is, the mapping to the cost evaluation indicator is that the longer the production year is, the lower the effect of the cost evaluation indicator on the location evaluation indicator is, and as the weight of the cost evaluation indicator, $$\frac{1}{1+e^{-N}}$$

can well fit a variation of a degree of effect of the cost evaluation indicator on the location evaluation indicator appearing as the production year varies, thereby adaptively adjusting the cost evaluation indicator; the longer the production year of the distributed energy storage assemblies is, the larger the energy storage benefit is after the energy storage benefit is accumulated over the production year, the higher the proportion of the importance of the energy storage benefit accounting for the setting of the construction positions is, the mapping to the benefit evaluation indicator is that the longer the production year is, the higher the effect of the benefit evaluation indicator on the location evaluation indicator is, and as the weight of the benefit evaluation indicator, $$\frac{1}{1+e^N}$$

can well fit a variation of a degree of effect of the benefit evaluation indicator on the location evaluation indicator appearing as the production year varies, thereby adaptively adjusting the benefit evaluation indicator.

Performing the weighted summation on the cost evaluation indicator and the benefit evaluation indicator based on the adaptive weights to obtain the location evaluation indicator includes the steps described below.

The cost evaluation indicator is weighted by using the weight $\omega_1$ of the cost evaluation indicator to obtain $\omega_1*F$, and the benefit evaluation indicator is weighted by using the weight $\omega_2$ of the benefit evaluation indicator to obtain $\omega_2*G$.

$\omega_1*F$ and $\omega_2*G$ are summed to obtain the location evaluation indicator Z, where a calculation formula of the location evaluation indicator is as follows:

$$Z=\omega_1*F+\omega_2*G.$$

In step S2, an optimal laying path of the distributed energy storage assemblies is planned in a planning area based on the location evaluation indicator so that a planning benefit of the construction positions of the distributed energy storage assemblies in the planning area is globally optimal, where the optimal laying path is characterized as a path formed after construction positions of all distributed energy storage assemblies in the planning area are connected in order.

Planning the optimal laying path of the distributed energy storage assemblies in the planning area based on the location evaluation indicator includes the steps described below.

In step one, the distribution area is rasterized to form a square raster map as a solving space, a square raster with an object present in the solving space is demarcated as an impassable raster, and a square raster without an object present in the solving space is demarcated as a passable raster.

In step two, a square raster where the distributed power supply is located is used as a search start point, n square rasters adjacent to the search start point are set as search space, and whether the impassable raster exists is determined in the search space.

If the impassable raster exists, the number of square rasters is doubled in the search space so that the search space is doubled, and the step two is performed.

If the impassable raster does not exist, a step three is performed.

In step three, a location evaluation indicator of each passable raster is calculated by using a positional coordinate of the each passable raster in the search space, passable rasters are arranged in a descending order based on location evaluation indicators, and first n passable rasters are selected as search targets.

In step four, a distance value between each search target and the search start point are calculated in sequence, the search targets are arranged in an ascending order according to distance values, and the search targets are linked to form the optimal laying path.

A space size of the square raster is consistent with a single space size of the distributed energy storage assemblies to construct the distributed energy storage assemblies in the square raster.

A construction position of each distributed energy storage assembly is solved in the distribution area through a search solution method, and the optimal laying path is obtained according to a distance between the distributed energy storage assembly and the distributed power supply, thereby preferentially performing an energy storage operation on a distributed energy storage assembly closer to the distributed power supply. When energy storage does not need to be performed on all the distributed energy storage assemblies, the energy storage operation is preferentially performed on the distributed energy storage assembly closer to the distributed power supply, thereby reducing an energy storage loss and improving an energy storage benefit. Moreover, orderly energy storage can avoid energy storage confusion between the distributed energy storage assemblies.

In step S3, the distributed energy storage assemblies are constructed according to the optimal laying path, and the distributed energy storage assemblies are connected to the power distribution network to perform an energy storage operation, where an energy storage priority is set for the energy storage operation with the optimal laying path as a criterion so that the distributed power supply performs orderly energy storage on the distributed energy storage assemblies in the power distribution network.

An energy storage priority of distributed energy storage assemblies located from a start point to an end point of the optimal laying path varies from high to low.

Based on the above distributed energy storage planning method for a power distribution network, the present application provides a planning system. The planning system includes an indicator setting unit 1, a path setting unit 2 and an energy storage planning unit 3.

The indicator setting unit 1 is configured to set a mathematical indicator for quantitatively evaluating superiority and inferiority of construction positions of distributed energy storage assemblies as a location evaluation indicator in a distribution area of a distributed power supply.

The path setting unit 2 is configured to plan an optimal laying path of the distributed energy storage assemblies in a planning area based on the location evaluation indicator so that a planning benefit of the construction positions of the distributed energy storage assemblies in the planning area is globally optimal, where the optimal laying path is characterized as a path formed after construction positions of all distributed energy storage assemblies in the planning area are connected in order.

The energy storage planning unit 3 is configured to construct the distributed energy storage assemblies according to the optimal laying path and connect the distributed energy storage assemblies to the power distribution network to perform an energy storage operation, where an energy storage priority is set for the energy storage operation with the optimal laying path as a criterion so that the distributed power supply performs orderly energy storage on the distributed energy storage assemblies in the power distribution network.

In the present application, the construction positions of the distributed energy storage assemblies are planned based on two aspects of cost and benefit, the adaptive weights are added to the cost and the benefit to form the location evaluation indicator, and the degrees of effect of the cost and the benefit on the location evaluation indicator appearing as the production year increases are adaptively controlled, which is more consistent with features of variation trends of the cost and the benefit appearing as the production year increases, thereby improving planning accuracy. Moreover, the optimal laying path of the distributed energy storage assemblies is planned in the planning area based on the location evaluation indicator so that the planning benefit of the construction positions of the distributed energy storage assemblies in the planning area is globally optimal, thereby improving the ordering of the planning.

The preceding embodiments are only example embodiments of the present application and are not used for limiting the present application. The scope of the present application is limited by the claims. Those skilled in the art may make various modifications or equivalent substitutions to the present application within the essence and scope of the present application. Such modifications or equivalent substitutions should also be construed as falling within the scope of the present application.

What is claimed is:

1. A distributed energy storage planning method for a power distribution network, comprising:

step S1: setting a mathematical indicator for quantitatively evaluating superiority and inferiority of construction positions of distributed energy storage assemblies as a location evaluation indicator in a distribution area of a distributed power supply;

step S2: planning an optimal laying path of the distributed energy storage assemblies in a planning area based on the location evaluation indicator, and achieving a planning benefit of the construction positions of the distributed energy storage assemblies in the planning area being globally optimal, wherein the optimal laying path is characterized as a path formed by sequentially connecting construction positions of the distributed energy storage assemblies in the planning area; and step S3: constructing the distributed energy storage assemblies according to the optimal laying path and connecting the distributed energy storage assemblies to the power distribution network to perform an energy storage operation, wherein an energy storage priority is set for the energy storage operation with the optimal laying path as a criterion to achieve orderly energy storage of the distributed energy storage assemblies by the distributed power supply in the power distribution network, wherein setting the mathematical indicator for quantitatively evaluating the superiority and the inferiority of the construction positions of the distributed energy storage assemblies as the location evaluation indicator comprises:

quantizing a construction cost of the distributed energy storage assemblies as a cost evaluation indicator, and quantizing an energy storage benefit of the distributed energy storage assemblies as the benefit evaluation indicator; and setting adaptive weights for the cost evaluation indicator and the benefit evaluation indicator based on a production year of the distributed energy storage assemblies, and performing weighted summation on the cost evaluation indicator and the benefit evaluation indicator based on the adaptive weights to obtain the location evaluation indicator, wherein quantizing the construction cost of the distributed energy storage assemblies as the cost evaluation indicator comprises:

quantizing a single construction cost and a construction cost of an energy storage line of each of the distributed energy storage assemblies, and summing the single construction cost and the construction cost of the energy storage line of each of the distributed energy storage assemblies to obtain a construction cost of each of the distributed energy storage assemblies, wherein a calculation formula of the construction cost is as follows:

$$f_i = A + a * \sqrt{(x_i - x_0)^2 + (y_i - y_0)^2};$$

wherein in the formula, $f_i$ is characterized as a construction cost of an i-th distributed energy storage assembly, A is characterized as a single construction cost, a is characterized as a construction cost of a unit length of an energy storage line, $x_i$ and $y_i$ are characterized as an abscissa value and an ordinate value of a positional coordinate of the i-th distributed energy storage assembly, respectively, $x_0$ and $y_0$ are characterized as an abscissa value and an ordinate value of a positional coordinate of the distributed power supply, respectively, $\sqrt{(x_i - x_0)^2 + (y_i - y_0)^2}$ is characterized as a length of an energy storage line between the i-th distributed energy storage assembly and the distributed power supply, and $a * \sqrt{(x_i - x_0)^2 + (y_i - y_0)^2}$ is characterized as a construction cost of the energy storage line of the i-th distributed energy storage assembly; and summing construction costs of all the distributed energy storage assemblies to obtain the cost evaluation indicator, wherein a calculation formula of the cost evaluation indicator is as follows:

$$F = \sum_{i=1}^{n} f_i;$$

wherein in the formula, F is characterized as the cost evaluation indicator, n is characterized as a total number of distributed energy storage assemblies, i is a measurement constant without a substantive meaning, and the energy storage line is characterized as being located between the distributed power supply and the distributed energy storage assemblies so that the distributed power supply performs discharge and energy storage on the distributed energy storage assemblies.

2. The distributed energy storage planning method for a power distribution network according to claim 1, wherein quantizing the energy storage benefit of the distributed energy storage assemblies as the benefit evaluation indicator comprises:

quantizing a single energy storage benefit and a loss benefit of an energy supply line of each of the distributed energy storage assemblies, and differencing the single energy storage benefit and the loss benefit of the energy supply line of each of the distributed energy storage assemblies to obtain an energy storage benefit of each of the distributed energy storage assemblies, wherein a calculation formula of the energy storage benefit is as follows:

$$g_i = B - b * \sqrt{(x_i - x_1)^2 + (y_i - y_1)^2};$$

wherein in the formula, $g_i$ is characterized as an energy storage benefit of the i-th distributed energy storage assembly, B is characterized as a single energy storage benefit, b is characterized as a loss benefit of a unit length of an energy supply line, $x_i$ and $y_i$ are characterized as the abscissa value and the ordinate value of the positional coordinate of the i-th distributed energy storage assembly, respectively, $x_1$ and $y_1$ are characterized as an abscissa value and an ordinate value of a positional coordinate of an energy supply input end in the power distribution network, respectively, $\sqrt{(x_i - x_1)^2 + (y_i - y_1)^2}$ is characterized as a length of an energy supply line between the i-th distributed energy storage assembly and the power distribution network, and $b * \sqrt{(x_i - x_1)^2 + (y_i - y_1)^2}$ is characterized as a loss benefit of the energy supply line of the i-th distributed energy storage assembly; and summing energy storage benefits of all the distributed energy storage assemblies to obtain the benefit evaluation indicator, wherein a calculation formula of the benefit evaluation indicator is as follows:

$$G = \sum_{i=1}^{n} g_i;$$

wherein in the formula, G is characterized as the benefit evaluation indicator, n is characterized as the total number of distributed energy storage assemblies, i is the measurement constant without the substantive meaning, and the energy supply line is characterized as being located between the distributed energy storage assemblies and the power distribution network so that the distributed energy storage assemblies perform discharge and energy supply on the power distribution network.

3. The distributed energy storage planning method for a power distribution network according to claim 2, wherein using the adaptive weights for adaptively controlling degrees of effect of the cost evaluation indicator and the benefit evaluation indicator on the location evaluation indicator appearing as the production year increases and constructing the adaptive weights by using a sigmoid function comprises:

constructing the weight $$\omega_1 = \frac{\alpha}{1+e^{-N}}$$

of the cost evaluation indicator by using $$\frac{1}{1+e^{-N}}$$

in the sigmoid function, wherein the degree of effect of the cost evaluation indicator on the location evaluation indicator tends to decrease as the production year of the distributed energy storage assemblies increases; and constructing the weight $$\omega_2 = \frac{\beta}{1+e^{N}}$$

of the benefit evaluation indicator by using $$\frac{1}{1+e^{N}}$$

in the sigmoid function, wherein the degree of effect of the benefit evaluation indicator on the location evaluation indicator tends to increase as the production year of the distributed energy storage assemblies increases; wherein $\omega_1$ and $\omega_2$ are characterized as the weight of the cost evaluation indicator and the weight of the benefit evaluation indicator, respectively, $\alpha$ and $\beta$ are constant coefficients without substantive meanings, and N is characterized as the production year.

4. The distributed energy storage planning method for a power distribution network according to claim 3, wherein performing the weighted summation on the cost evaluation indicator and the benefit evaluation indicator based on the adaptive weights to obtain the location evaluation indicator comprises:

weighting the cost evaluation indicator by using the weight $\omega_1$ of the cost evaluation indicator to obtain $\omega_1*F$, and weighting the benefit evaluation indicator by using the weight $\omega_2$ of the benefit evaluation indicator to obtain $\omega_2*G$; and summing $\omega_1*F$ and $\omega_2*G$ to obtain the location evaluation indicator Z, wherein a calculation formula of the location evaluation indicator is as follows:

$$Z=\omega_1*F+\omega_2*G.$$

5. The distributed energy storage planning method for a power distribution network according to claim 4, wherein planning the optimal laying path of the distributed energy storage assemblies in the planning area based on the location evaluation indicator comprises:

step one: rasterizing the distribution area to form a square raster map as a solving space, demarcating a square raster with an object present in the solving space as an impassable raster and demarcating a square raster without an object present in the solving space as a passable raster;

step two: using a square raster where the distributed power supply is located as a search start point, setting n square rasters adjacent to the search start point as search space and determining whether the impassable raster exists in the search space;

wherein if the impassable raster exists, doubling a number of square rasters in the search space to achieve a doubling of the search space, and performing the step two; or if the impassable raster does not exist, performing a step three;

the step three: calculating a location evaluation indicator of each passable raster by using a positional coordinate of each passable raster in the search space, arranging passable rasters in a descending order based on location evaluation indicators and selecting first n passable rasters as search targets; and step four: calculating a distance value between each search target and the search start point in sequence, arranging the search targets in an ascending order according to distance values and linking the search targets to form the optimal laying path.

6. The distributed energy storage planning method for a power distribution network according to claim 5, wherein a space size of the square raster is consistent with a single space size of the distributed energy storage assemblies to construct the distributed energy storage assemblies in the square raster.

7. The distributed energy storage planning method for a power distribution network according to claim 6, wherein an energy storage priority of distributed energy storage assemblies located from a start point to an end point of the optimal laying path varies from high to low.

8. A planning system of the distributed energy storage planning method for a power distribution network according to claim 1, comprising:

an indicator setting unit configured to set a mathematical indicator for quantitatively evaluating superiority and inferiority of construction positions of distributed energy storage assemblies as a location evaluation indicator in a distribution area of a distributed power supply;

a path setting unit configured to plan an optimal laying path of the distributed energy storage assemblies in a planning area based on the location evaluation indicator so that a planning benefit of the construction positions of the distributed energy storage assemblies in the planning area is globally optimal, wherein the optimal laying path is characterized as a path formed after construction positions of all distributed energy storage assemblies in the planning area are connected in order; and an energy storage planning unit configured to construct the distributed energy storage assemblies according to the optimal laying path and connect the distributed energy storage assemblies to the power distribution network to perform an energy storage operation, wherein an energy storage priority is set for the energy storage operation with the optimal laying path as a criterion so that the distributed power supply performs orderly energy storage on the distributed energy storage assemblies in the power distribution network.

* * * * *